United States Patent [19]

Wood

[11] Patent Number: 4,542,737

[45] Date of Patent: Sep. 24, 1985

[54] COMBINED PRESSURIZED AIR SOLAR HEAT SENSING HEAD ASSEMBLY AND A PRESSURIZED WATER DRIVE SYSTEM USED TO MOVE SOLAR ENERGY COLLECTORS IN TRACKING THE SUN

[76] Inventor: Kenneth G. Wood, 4417 Evanston Ave. N., Seattle, Wash. 98103

[21] Appl. No.: 606,844

[22] Filed: May 1, 1984

Related U.S. Application Data

[63] Continuation-in-part of Ser. No. 310,230, Oct. 9, 1981, abandoned.

[51] Int. Cl.⁴ .................... F24J 3/02; F16H 29/02; F01B 19/00; G01J 1/20
[52] U.S. Cl. .................... 126/425; 250/203 R; 92/90; 74/89.2
[58] Field of Search ............ 126/424, 425; 353/3; 250/203 R; 136/246; 74/89.2, 89.22; 92/91, 92, 90, 89, 64

[56] References Cited

U.S. PATENT DOCUMENTS

| | | | |
|---|---|---|---|
| 3,999,389 | 12/1976 | Bryce | 126/424 |
| 4,263,892 | 4/1981 | Little | 126/424 |
| 4,306,541 | 12/1981 | Hutchison | 126/424 |
| 4,351,319 | 9/1982 | Robbins | 126/425 |

FOREIGN PATENT DOCUMENTS 2915600 10/1980 Fed. Rep. of Germany .......... 92/90

Primary Examiner—William E. Lyddane
Assistant Examiner—Gerald A. Anderson
Attorney, Agent, or Firm—Roy E. Mattern, Jr.

[57] ABSTRACT

In moving solar energy collectors to track the sun, there are combined:

a pressurized air solar heat sensing head assembly, utilizing compressed air in adjacent and opposing chambers, each chamber having a flexible diaphragm closely contacting an actuator of a four way valve of a pressurized water drive system, with these chambers being located on opposite sides of a sunshade assembly;

a pressurized water drive system having the four way valve moved by the pressurized solar heat sensing head assembly, whereby water under pressure from this valve is directed to one side or the other of an actuator utilizing compact and collapsible hoses, which in expanding to receive the pressurized volume of water, move a power take off connector, in turn attached to a cable of a pulley drive subassembly, in turn rotatably secured to solar energy collectors to adjustably position them; and solar energy collectors selected from many types each of which is mountable about one structurally supported axis assembly, to make automatic daily adjustments, and about another structurally supported axis assembly, to make seasonal adjustments of these solar energy collectors in tracking the sun to gain the benefits of maximum solar energy.

3 Claims, 11 Drawing Figures

COMBINED PRESSURIZED AIR SOLAR HEAT SENSING HEAD ASSEMBLY AND A PRESSURIZED WATER DRIVE SYSTEM USED TO MOVE SOLAR ENERGY COLLECTORS IN TRACKING THE SUN

This application is a continuation-in-part of application Ser. No. 06/310,230, filed 10/9/81, now abandoned.

BACKGROUND OF THE INVENTION

In U.S. Pat. No. 4,263,892, Frederick H. Little and David C. Little in 1981 described their heat sensing means, particularly used with solar water heating apparatus. They provide temperatures differential sensing means for sensing temperatures at the respective opposite sides of a heat shield in turn supporting a solar collector. By so doing they monitor the alignment of the heat shield and solar collector with respect to the sun to maintain the heat shield and solar collector in operative aligned relationship with the sun throughout each day. Their temperature sensing chambers are filled with air and connected to pressure sensitive pilot actuators, each actuator having a diaphragm commonly connected to the other diaphragm. The diaphragms move only in response to changes in temperature between the air filled sensing chambers, and not to variations in ambient temperatures. The common connection between the diaphragms is also connected at its midpoint to an actuating lever of a three way valve assembly. This valve assembly moves to admit or to drain water from a servo actuator, which moves the solar heat collector and its heat shield about an axis alternately in both east and west directions.

Some other patents which illustrate and describe the use of two pressurized temperature sensors, utilizing the expansion of fluids under pressure and temperature, which sensors are spaced apart in locations differently receiving the heat from the sun, when their associated solar collector is not closely tracking the sun, and whereby the differential of pressures created by these temperature sensors effectively acts through an associated actuator assembly to cause realignment of the solar collector with the moving sun, are:

U.S. Pat. No. 3,680,307 L. W. Michalec's Heat Energy Transfer Device;
U.S. Pat. No. 4,159,710 G. Prast's Solar Collector Comprising Solar Tracking Means;
U.S. Pat. No. 4,185,615 E. W. Bottum's Solar Collector Structure;
U.S. Pat. No. 4,198,954 R. J. Meijer's Solar Collector Comprising Solar Tracking Means;
U.S. Pat. No. 4,211,212 R. J. Braun's Solar Refrigeration System; and
U.S. Pat. No. 4,262,654 C. J. Ward's Solar Energy Powered Sun Tracker.

Some other patents which illustrate and describe the use of resilient and/or compactable and collapsible hoses or tubes, which is expanding to receive the presurized volume of fluids, move related components, are:

U.S. Pat. No. 2,987,004 J. L. Murray's Fluid Pressure Device;
U.S. Pat. No. 3,014,459 J. A. Gustair's Reciprocating Motion Device;
U.S. Pat. No. 3,045,611 J. L. Murray's Fluid Pressure Devices;
U.S. Pat. No. 3,417,942 E. M. VanAlstyne's Projectable Structure;
U.S. Pat. No. 3,494,260 J. L. Critcher's Actuator; and
U.S. Pat. No. 3,673,924 S. Zakrezewski's Fluid Motors.

SUMMARY OF THE INVENTION

This combined pressurized air solar heat sensing head assembly and a pressurized water drive system used to move solar energy collectors in tracking the sun, operates very reliably and without incurring any operating costs, when the comparatively small quantity of water drained from the drive system during a day's operation is essentially recycled for other purposes. Most of the components are commercially available, and other components are fabricated and/or derived from commercially available materials and products all of comparatively low cost. Moreover, air is always available and generally water from pressurized mains of municipalities' tank systems, or pressurized well systems, is essentially available throughout the world.

This combination is readily producible in subassemblies. The heat sensing head assembly could be produced and shipped separately. Or the combined heat sensing head assembly and the pressurized water drive system could be produced and shipped separately. Moreover, the entire combination completed, or partially completed, could be shipped readily throughout the world to help many persons receive the benefits of the energy of the sun.

Also this combination is readily producible in various sizes for automatically moving one or more solar energy collectors of one or more differet types. At all times each combination operates to accurately move solar energy collectors in tracking the sun.

This combination for tracking the sun always involves the close arrangement: of the respective grouping of the pressurized air solar heat sensing head assembly; of the respective grouping of the pressurized water drive system; and of the respective sole or group solar energy collectors. Such close arrangement keeps frictional losses at a minimum, places the operational components for very convenient observation, adjustment and maintenance, and locates these operational components for their convenient securement from unwanted manipulations, when necessary.

This combination in utilizing the energy from the sun, via pressurized air chambers incorporating diaphragms, and energy from water systems, incorporates only a minimum number of hydraulic and mechanical components keeping their related operating frictional losses to a minimum. By using the compact and collapsible hoses, in respect to some embodiments such hoses being garden hoses, there occurs the substantially direct utilization of the water volume under pressure to create the actuation forces used in moving the solar energy collectors. Also by using the pressurized air chambers with their respective diaphragms directly and closely connected to the movable water four way valve, there occurs the substantially direct utilization of sun related energy changes in the pressurized air to sense the daily movement of the sun in an east to west direction, and in the morning to sense the sun in the east for an automatic quick return from the west to east positioning of the solar energy collectors.

DESCRIPTION OF THE DRAWINGS OF THE PREFERRED EMBODIMENTS

Preferred embodiments of this combined pressurized air solar heat sensing head assembly and a pressurized water drive system used to move solar energy collectors in tracking the sun are illustrated in the drawings, wherein.

Figure 5:
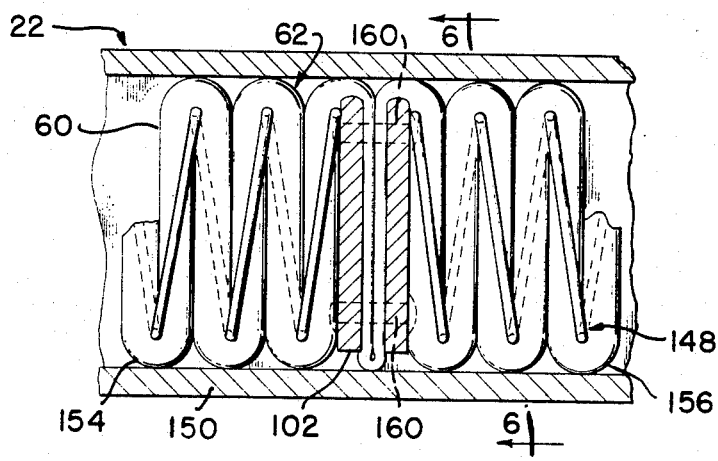
Figure 6:
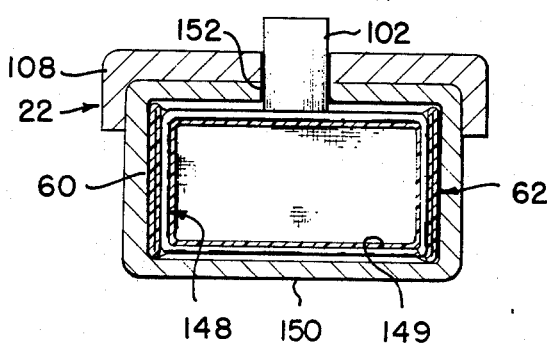
Figure 7:
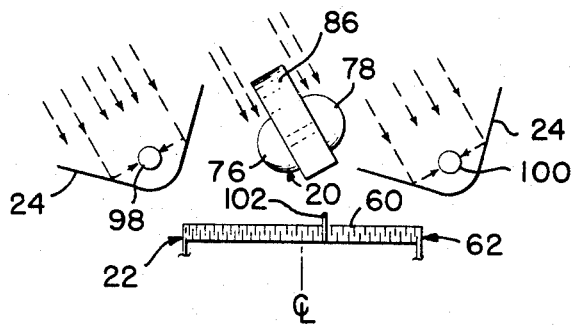
Figure 8:
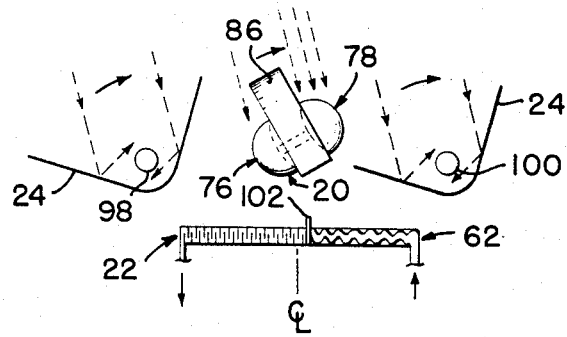
Figure 9:
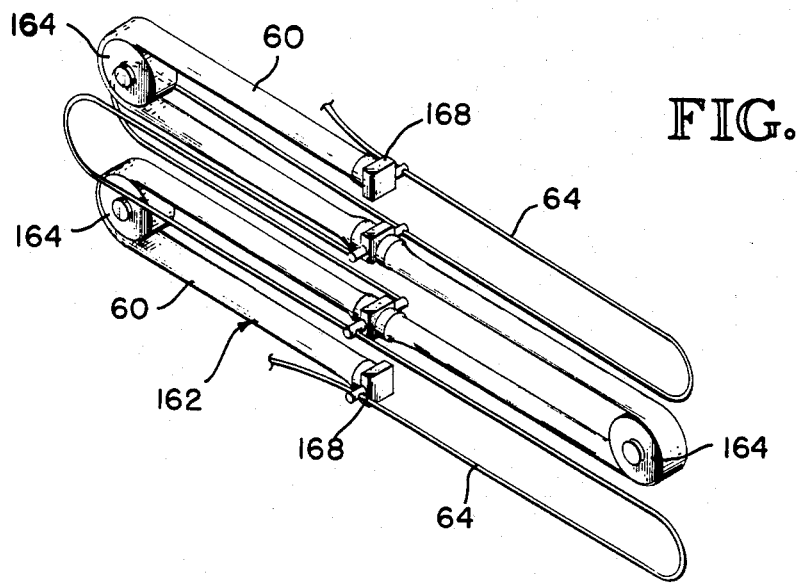
Figure 10:
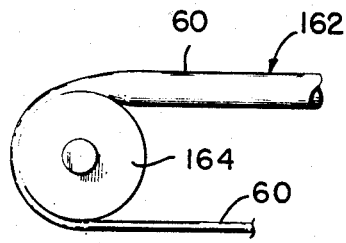
Figure 11:
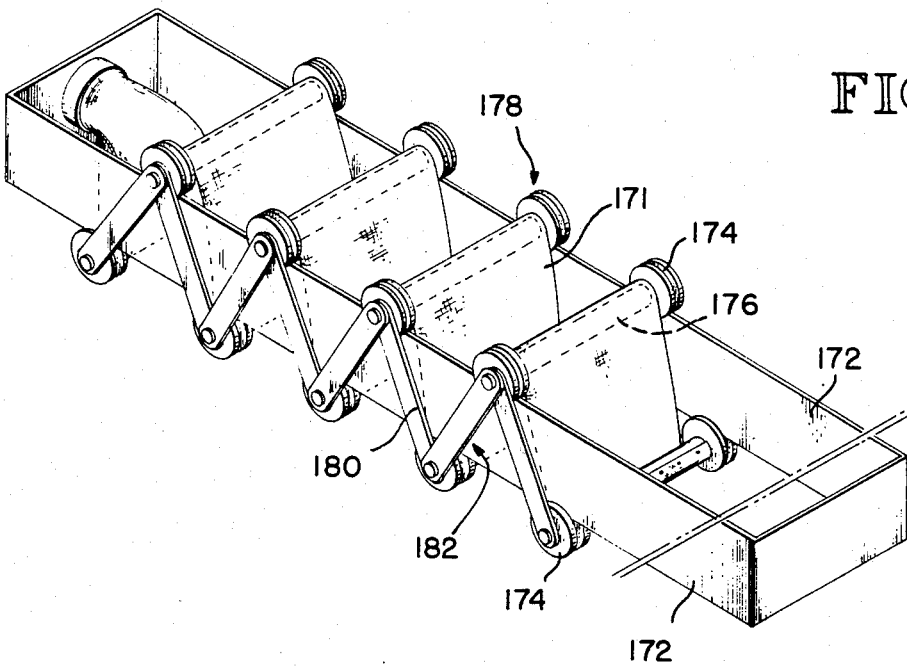

FIG. 5 is a partial longitudinal cross sectional view of the compact, collapsible, flat, hoses which expand upon receiving the pressurized volume of water distributed through the four way valve of the pressurized water drive system, showing, in addition, the intertwined wire, surrounding guide, tube, or housing, and the power take off secured to the flat hose at this midpoint, when the flat hose is in the neutral position of balanced pressures;

FIG. 6 is a partial transverse cross sectional view, taken along the shifted sectional line 6—6 of FIG. 5, indicating the cross sectional volume of the compact, collapsible, flat, hose, and showing the intertwined light gauge wire wound in rectangular cross-sections throughout the hose, which in conjunction with the surrounding guide, tube, or housing prevents the hose from doubling over itself or otherwise improperly positioning itself, and illustrating the power take off secured to the flat hose at this midpoint, when the flat hose is in the neutral position of balanced pressures;

FIG. 7 is a schematic partial elevational view to indicate the positioning of the solar energy collectors, the pressurized air solar heat sensing head assembly, and the compact collapsible flat hoses, when the solar energy collectors are accurately tracking sun, with the dotted lines indicating the sun rays;

FIG. 8 is a schematic partial elevational view to indicate the positioning of the solar energy collectors, the pressurized air solar heat sensing head assembly, and the compact collapsible flat hoses, filled on one side, to cause movement of the solar energy collectors to regain their direct and balanced tracking of the sun, with the dotted lines indicating the sun rays;

FIG. 9 is a schematic orthographic partial view of another embodiment of a flat hose arrangement, wherein the water filling of the several transverse hose portions in the selected locales provides a multiple overall translating force at the top power take off to drive a pulley system which in turn rotates the solar energy collectors to keep them tracking the sun;

FIG. 10 is an enlarged schematic partial side view to illustrate how a water seal is created by tightly passing the hose over a wheel, in reference to the flat hose arrangement, illustrated in FIG. 9; and FIG. 11 is a schematic orthographic partial view of another embodiment of a flat hose arrangement, wherein the hose is of substantial size, such as a fire hose, which is then guided and controlled by the assembly of the guide rails, rollers, their cross pins, or cross shafts, and their links, when the fire hose fills with water, and the power take off readily moves, ultimately resulting in the solar energy collectors accurately tracking the sun.

DESCRIPTION OF THE PREFERRED EMBODIMENTS

General Overall Arrangement

Figure 1:
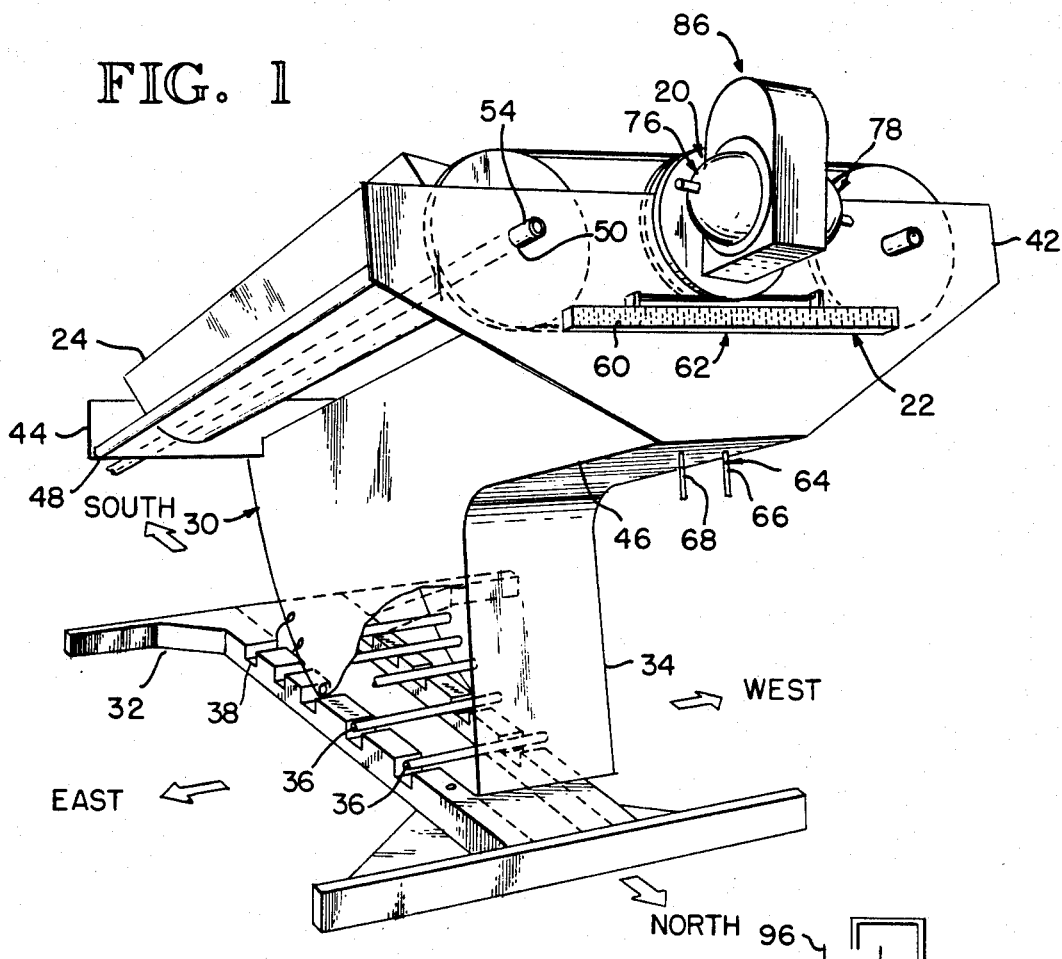
FIG. 1 is an orthographic view of this combination wherein solar energy collectors are accurately and automatically moved each day to track the sun, using energy from the sun and energy from a pressurized water system.

In FIGS. 1 through 8, the arrangement of the preferred embodiment is illustrated of the combined pressurized air solar heat sensing head assembly 20 and the pressurized water drive system 22 used together, to move solar energy collectors 24 in their automatic tracking of the sun in an east to west direction and return. As necessary, this overall combination 30, as shown in FIG. 1, includes a firmly positioned base 32 oriented in a north south direction, a pivotal frame 34 rotatably and selectively positioned on the base 32.

Selective rotation of pivotal frame 34 is undertaken periodically throughout the seasons, to place the solar energy collectors at their best inclinations, to receive the maximum energy of the sun, when they are excellently and automatically tracking the sun, during its daily east to west travel and automatically returned each morning when the sun rises. To maintain a selected position of the pivotal frame 34 for a definite time, two cross bars 36 of several arcuately spaced cross or transverse bars 36 on the pivotal frame 34, are positioned, selectively and respectively, in two pairs of several oppositely and transversely horizontally spaced receiving slots 38 on the base 32, as shown in FIG. 1. Thereafter, during other seasons, different sets of pairs of cross bars 36 and receiving slots 38 are selected and utilized.

The pivotal frame 34 includes front and back transverse supports 42, 44 supported centrally by a longitudinal open box frame 46 and at each side by longitudinal rods 48. These front and back transverse supports 42, 44 have bearings 50 to receive the extending shafts 54 of the solar energy collectors 24.

As also shown in FIG. 1, the front transverse support 42 serves as the mounting locale for the compact and collapsible flat hose subassembly 62 of the pressurized water drive system 22. Moreover, this front transverse support 42, on pivotal frame 34, rotatably supports on bearings, not shown, the pressurized air solar energy sensing head assembly 20.

The water line 64, one a supply 66, and the other a drain 68, are connected below the box frame 46, as shown in FIG. 1. Other water lines 64 are illustrated in FIGS. 2, 4, and 9, which extend between the four way valve 70, the manifold 72 and beyond, inclusive of the subassembly 62 of the compact collapsible hose 60, and the supply 66 and drain 68 lines.

Figure 3:
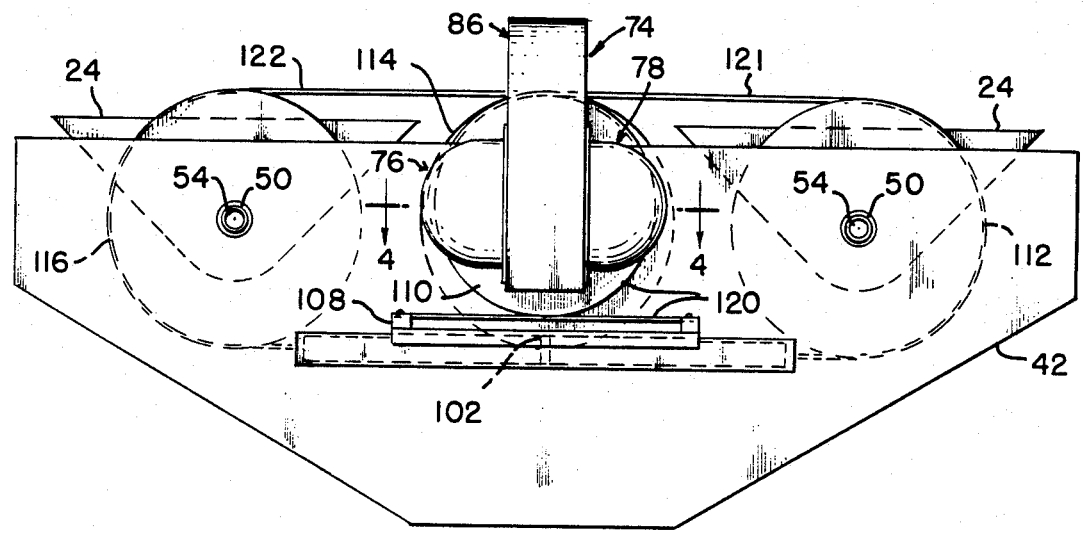
FIG. 3 is a partial front view of this combination shown in FIG. 1, showing the centralized location of the essential assemblies utilized in sensing the sun's movement and then in quickly moving the solar energy collectors to accurately track the sun to gain the maximum solar energy.
Figure 4:
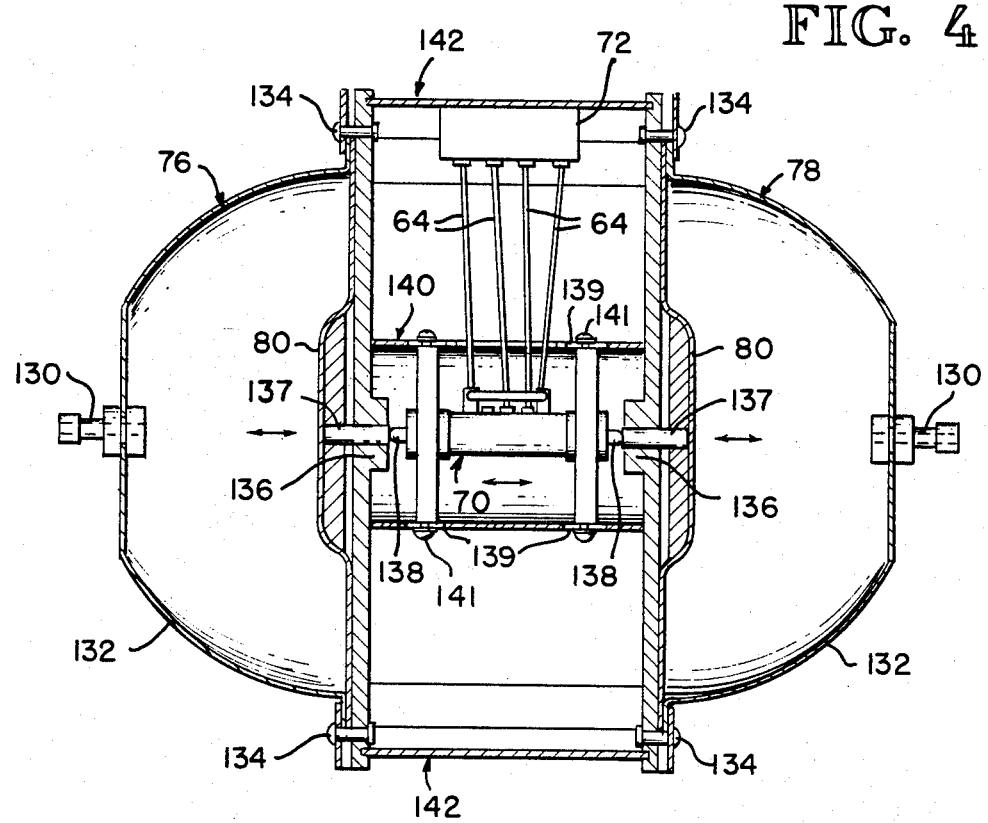
FIG. 4 is a partial top cross sectional view taken in the geometric plane indicated by section line 4—4, in FIG. 3, to illustrate location and operation of the pressurized air chambers with their diaphragms commonly contacting the translating vave stem of the four way valve in the pressurized water system.

In FIGS. 1, 3, and 4, the sun shield subassembly 74 is illustrated positioned between the pressurized air solar heat sensing chambers 76, 78 which each have flexible diaphragms 80. The frame 84 of the sun shield subassemly 74 serves as a mounting structure to receive the: sensing chambers 76, 78; the four way valve 70; the manifold 72; the sun shield 86; the shaft, not shown, about which the sun shield subassembly 74 rotates; and the diaphragms 80 and their pins 137 operatively relating, via contact with the valve stem, i.e. shaft 138, with the four way valve 70.

General Overall Operation

Figure 2:
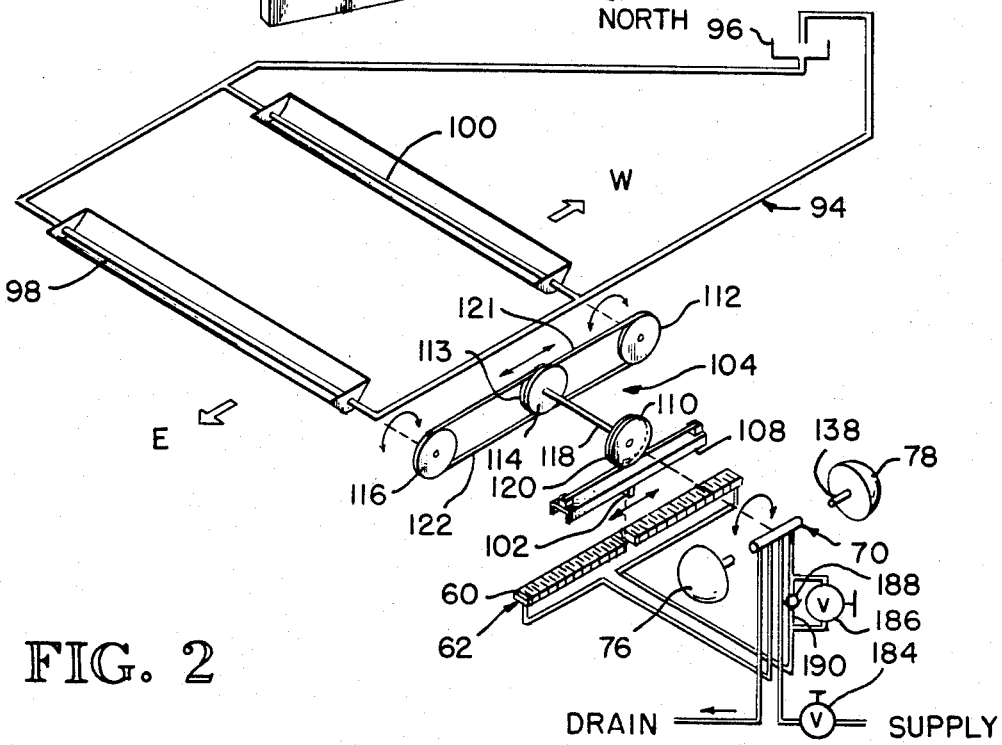
FIG. 2 is an orthographic schematic view of the components used in direct conjunction with the solar pressurized air, pressurized water and the solar heated air, and the pulley system used in ultimately moving the solar energy collectors.

In FIGS. 2, 7 and 8, the general overall operation is schematically illustrated. In this embodiment the ultimate objective is to gain as much solar radiation as possible in the solar energy collectors 24 illustrated as solar heat collectors 24, and conduct this heat away via a circulating water system 94, inclusive of a heat transfer unit 96. Portions 98 and 100 of this water system 94 are part of the respective solar heat, i.e. energy, collectors. As illustrated in FIG. 7, the solar energy collectors 24 are positioned accurately in tracking the sun to receive the maximum solar radiation. The pressure air solar heat sensing head assembly 20 has both of it pressurized chambers 76, 78 receiving the same solar heat i.e. radiation, and they are thus at the same pressure. Therefore there is no movement of their respective diaphragms 80. In turn then there is no movement of the four way valve 70. Therefore the compact, collapsible, flat hose 60 is in a balanced pressure condition, with its power take off 102 so positioned. There is no force then tending to move the cable and pulley drive system 104 of the overall pressurized water drive system 22. As illustrated in FIG. 8, the sun has moved sufficiently, so one of the pressurized chambers 78 is receiving more solar heat, i.e. radiation, than the other chamber 76. The latter is being shaded by the sun shield 86. Therefore, as also shown in FIG. 2, there is movement of the diaphragms 80, commencing the follow on movements of the four way valve 70, the expansion of the hose 60, movement of the power take off 102, movement of the translating drive rod 108 of the cable-pulley drive system 104, and via the rotation of its various pulleys 110, 112, 113, 114, 116 and the transmitting shaft 118, utilizing the cables 120, 121, 122, there is the wanted movement of the solar heat collectors 24 in their accurate tracking of the sun.

Pressurized Air Solar Heat Sensing Head Assembly

In FIGS. 1, 2, 3, 4, and 5 the arrangement, location, and operation of the pressurized air solar heat sensing head assembly 20 are illustrated. Also this assembly 20 has been previously described. However, in FIG. 4, more of the internal components are illustrated. Each chamber 76 and 78 has a valve 130 through which pressurized air is admitted. Both chambers are initially filled at their null diaphragm positions with equal pressure air. Changes thereafter will only be undertaken, if necessary, to equalize and/or raise the air pressures of these chambers 76, 78. Environmental air temperature changes do not affect the capability of this pressurized air solar heat sensing head assembly 20 to always accurately sense the need for moving the solar energy collectors 24 to track the sun.

The heat transmitting shells 132 of each chamber 76, 78, and the diaphragms 80 are held in place adjacent the frame 84 by fasteners 134. The bearings 136 of frame 84 support the diaphragm pins 137 of the diaphragms 80, of each of the chambers 76, 78, and the movable valve stem 138, i.e. shaft or sleeve, of the four way valve 70.

The sub frame 140 with various members positions the four way valve 70 within the frame 84. In this sub frame 140 there are lateral adjustment slots 139 and cooperating fasteners 141 which are used initially in setting the valve 70 in its null position.

The shielding of the sun rays is via the sun shield subassembly 74 which includes the frame 84, and the encompassing surface structure 142. A water manifold 72 is positioned on this surface structure 142 and by frames 84. Water lines 64 are connected between the ports of the valve 70 and the manifold 72.

As so arranged and rotatably secured by a shaft and bearing assembly, not shown, this pressurized solar heat sensing head assembly 20 operates as illustrated in FIGS. 2, 7, and 8, to initiate, when necessary, the operation of the pressurized water drive system 22, to move the solar heat collectors 24 in their accurate tracking of the sun.

Pressurized Water Drive System

In all the figures the embodiments of the pressurized water drive system 22 are illustrated in part with FIG. 2 indicating schematically this overall drive system 22. Also this drive system 22 has been previously described. However, in FIGS. 5 and 6, more of the components are illustrated. In the first embodiment, the compact, collapsible, flat hose 60 is folded back and forth about an intertwined light gauge wire 148 wound in rectangular cross sections 149. When pre-assembled, the hose 60 and wire 148 are inserted endwise in a tube 150 and the tube ends are closed and sealed, leaving only a top longitudinal slot 152 open along this subassembly 62 of the compact collapsible flat hose 60. At the midpoint of the left 154 and right 156 operating volumes of this subassembly 62 a power take off structure 102, which also seals the hoses, is installed using fasteners 160. During operations water is used within the tube as a lubricant.

In FIGS. 9 and 10, another embodiment of a flat hose pressurized water drive system 162 is illustrated. One, two, three, or more water powered two way strokes, which supplement each other, are provided by passing the hose 60 over rollers 164 with sufficient tension so water seals are created. At the initial neutral position of each two way stroke 166, as illustrated in FIG. 9, the hose portions are connected to valves 168 which are supplied with water through water lines 64. As water flows in one direction in water lines 64 respective hose portions are filled with water under pressure and the other respective hose portions on opposite sides of the valves 168 are drained. When water flows in the other direction in water lines 64, the formerly filled, i.e. expanded, hose portions are drained, and those previously drained are filled, i.e. expanded. Such movements are transmitted via a power take off, not shown, to a pulley system, not shown, in this embodiment of a pressurized water drive system 162.

In FIG. 11, another embodiment of a flat hose pressurized water drive system 170 is illustrated which is made to control the expanding and contracting movements of a large flat hose like a fire hose 171. Spaced guide rails 172 guide and position rollers 174 transversely connected to opposite rollers 174 by shafts 176. The variable longitudinal spacing of the various combined units 178 of rollers 174 and shaft 176 is controlled by links 180 of an overall parallel linkage system 182. The large flat hose 171 is threaded through this linkage system being passed over and under the respective top and bottom shafts 176. Although not shown, there will be a like power take off, which is initially located midway, when this large flat hose pressurized water drive system 170 is in its neutral position.

All these pressurized water drive systems 22, 162, and 170 are sufficiently powered by water available through municipal water sources. The systems 22 and 162, in addition are sufficiently powered by water available both through municipal and private water sources.

As illustrated in FIG. 2, a main water valve 184 is installed to turn on and off the water coming from a municipal pressurized water system, or another water system. This valve 184 is selectively opened to set the return water flow rate of the water flowing to the water actuators 62, etc., when the solar energy collectors 24 in the early morning are comparatively rapidly returning, while seeking the morning sun to obtain the maximum radiant energy then available.

During the daily east to west movement of the solar energy collectors 24, a flow rate valve 186 is set to keep the water flow rate at a lower rate to the water actuators 62, etc. When the early morning more rapid return of solar energy collectors 24 is undertaken, then a check valve 188 opens and the discharging water flows rapidly through bypass 190, unhindered by valve 186.

Other Uses of the Assemblies, Systems, and Components

The pressurized air solar heat sensing head assembly, although specifically described as sensing changes in solar radiant heat, could be used in other locations where radiant heat from other sources was to be monitored.

The pressurized water drive systems, although specifically described as driving solar energy collectors, could be used in other equipment to power other components.

Some of the Materials Used in the Embodiment of FIG. 1

The flat hose is commercially available. From one supplier, "Richco", the source is designated by the trademark "Ultra Hose". It is specified as a five eighths inch inside diameter flat hose. The hose has a solid non toxic liner which is surrounded by a woven fabric covering. As shown in FIGS. 5 and 6, this hose 60 is arranged in two inch folds, which are intertwined with a light gauge wire 148 wound in rectangular cross sections 149. The hose and wire are placed in a tube having a rectangular cross section of one and one sixteenth inches high and two inches wide. By way of example, when water at 40 p.s.i. is tapped, a 40 pound force is available at midstroke.

Plywood of various thickness and/or light gauge metals are used throughout the supporting structures.

The quantity of water used is comparatively small and a plastic supply hose of only one sixteenth of an inch in inside diameter is used. In the embodiment shown in FIG. 1, only a pint of water is drained during a full day's east to west tracking the sun.

I claim:

1. A sun tracking solar energy collector assembly, comprising:
   (a) a continuous frame assembly having bearings to rotatably receive tiltable solar energy collectors for their east to west movement and return, a pivotal means to adjust these collectors for their seasonal angles of inclination, a bearing located between the bearings supporting these collectors, to rotatably receive a solar energy sensing head assembly, and fasteners to firmly support a pressurized water drive system just below this solar energy sensing head assembly;
   (b) a solar energy sensing head assembly rotatably secured to the frame having a central sunshield structure, pressurized air chambers with each chamber having a diaphragm and being supported immediately on opposite sides of the sunshield structure, and a valve secured to the sunshield structure with its movable valve stem immediately operatively related to each diaphragm for translating movement, when air pressures are different in the pressurized air chambers because of differences in the solar energy being absorbed;
   (c) a solar energy collector driving system fastened to the frame and having adapters to connect to a pressurized water source, a water distributor assembly to direct water from a pressurized water source through the valve of the solar energy sensing head, and beyond to one side or the other of a water powered actuator, the water powered actuator in turn connected to a power transmission, the power transmission in turn connected to the solar energy sensing head assembly and connected to tiltable solar energy collectors; and
   (d) solar energy collectors tiltably and pivotally secured to the frame to be tilted from east to west and returned during a twenty four hour period and to be inclined periodically throughout the seasons of the year.

2. A sun tracking solar energy collector assembly, comprising, a frame, a combined pressurized air solar energy sensing head assembly, and a pressurized water drive system used to move solar energy collectors in tracking the sun, wherein:
   (a) a solar energy sensing head assembly comprises, a sunshield structure, pressurized air chambers, each with a diaphragm supported by and on the opposite sides of the sunshield structure, a four way valve secured to the frame of the sunshield and also operatively related to each of the diaphragms;
   (b) the drive system comprises a pressurized water source, a manifold to distribute water, tubes to convey water from a pressurized water source for flow control by the four way valve in the sunshield and on to the water distribution manifold, and an actuator comprising, in turn, collapsible flat hoses, which expand when receiving pressurized volumes of water and thereby move a power take off connector, and a pulley-cable drive assembly moved by the power take off connector to in turn move the solar energy collectors and the solar energy sensing head assembly;
   (c) the solar energy collectors comprises at least one collector; and
   (d) the frame comprises bearings to rotatably receive the tiltable solar energy collectors, a pivotal means to adjust the collectors for their seasonal inclinations, a bearing located between the bearings supporting the collectors, to rotatably receive the solar energy sensing head assembly, and fasteners to support the pressurized water drive system just below this solar energy sensing head assembly.

3. A combined pressurized air solar energy sensing head assembly and a pressurized water drive system used together to move solar energy collectors in tracking the sun, wherein:

(a) a frame assembly has bearings to rotatably receive tiltable solar energy collectors for their east to west daily tracking movement, a bearing located between the bearings supporting these collectors to rotatably receive the pressurized air solar energy sensing head assembly, and fasteners to firmly support a pressurized water drive system just below this solar energy sensing head assembly;

(b) a pressurized air solar energy sensing head assembly rotatably secured to the frame assembly and having a sunshield, pressurized air chambers with each chamber having a diaphragm and each chamber being immediately supported on a respective opposite side of the sunshield, and a valve secured to the sunshield with the movable valve member immediately operatively related at respective ends to each diaphragm, for receiving translating movement forces when air pressures become different in the pressurized air chambers because of differences in the solar energy being absorbed; and (c) a pressurized water drive system fastened to the frame and having connectors for receiving water from a pressurized water source, a water distribution assembly to direct water from a pressurized water source through the valve secured to the sunshield and beyond alternatively to one side or the other of a water powered actuator, the water powered actuator in turn being connected to a power transmission, the power transmission in turn being connected to tiltable solar energy collectors and to the pressurized air solar energy sensing head assembly, keeping the solar energy collectors and solar energy sensing assembly in their same relative position to one another.

* * * * *